United States Patent [19]

Liu

[11] 4,284,515

[45] Aug. 18, 1981

[54] PROCESS FOR DECREASING ELEMENTAL PHOSPHORUS LEVELS IN AN AQUEOUS MEDIUM

[75] Inventor: Chong T. Liu, West Nyack, N.Y.

[73] Assignee: Stauffer Chemical Company, Westport, Conn.

[21] Appl. No.: 102,167

[22] Filed: Dec. 10, 1979

[51] Int. Cl.³ ............................................... C02F 1/54
[52] U.S. Cl. ..................................... 210/724; 210/906
[58] Field of Search ............... 210/DIG. 29, 702, 709, 210/724, 906, 907

[56] References Cited

U.S. PATENT DOCUMENTS

| | | | |
|---|---|---|---|
| 3,971,707 | 6/1976 | Deshponde | 210/DIG. 29 |
| 4,228,003 | 10/1980 | Makino | 210/907 X |

FOREIGN PATENT DOCUMENTS 888085  1/1962  United Kingdom ............ 210/DIG. 29

OTHER PUBLICATIONS

Van Wazer, *Phosphorous and Its Compounds*, vol. II, pp. 1204–1205 (1961).
"Waste Control in a Fragile Environment", *Envir. Sci. & Tech.*, vol. 6, p. 980 (1972).
Ackerman et al., "Direct Determination, etc.", Proc. Chem. Inst. of Canada, Polln. Conf., Halifax, Aug., 1969, pp. 140–147.
"Coexistence of a Fishery, etc.", Proc. Chem. Inst. of Canada, Polln. Conf., Halifax, Aug., 1969, pp. 5–15.

*Primary Examiner*—Thomas G. Wyse
*Attorney, Agent, or Firm*—Vivienne T. White

[57] ABSTRACT

A process is provided for decreasing elemental phosphorus levels in an aqueous medium containing elemental phosphorus. Preferably, the elemental phosphorus levels are at about 10 ppm or less. The process comprises adding to the aqueous medium an effective amount of caustic, preferably $Ca(OH)_2$, the effective amount being an amount sufficient to increase the pH of the aqueous medium to at least about 11, to produce a basic aqueous medium. The basic aqueous medium is then clarified and neutralized.

6 Claims, No Drawings

PROCESS FOR DECREASING ELEMENTAL PHOSPHORUS LEVELS IN AN AQUEOUS MEDIUM

BACKGROUND OF THE INVENTION

1. Field of the Invention

This process relates to a method of decreasing the elemental phosphorus ($P_4$) levels in an aqueous medium, and more particularly, an aqueous medium which is the liquid waste effluent from the electric furnace process for preparing elemental phosphorus.

2. Prior Art

In the electric furnace process for preparing phosphorus phosphate-bearing ore, rock or earth is charged to an electric furnace with silica and carbon, usually in the form of coke or coal. The electric furnace is heated to a sufficient temperature to melt the charge. The phosphorus generated is removed as a vapor with carbon monoxide gas. This vapor, however, as it leaves the furnace, entrains minute particles of carbon, phosphate rock and other materials present in the furnace. This phorphorus-containing gas stream is generally passed into a hot gas precipitator which removes a large portion of the entrained solids. The stream is then passed through a hood type condensor before it is exhausted through a spray tower.

Thus, a major portion of the phosphorus vapor is condensed by cooling with water. The greater proportion of this condensed phosphorus separates and is filtered to remove residual dirt particles. The phosphorus is collected and stored under water for it is combustible when exposed to air.

The liquid waste effluent from this process is called "phossy" water. The phossy water contains small quantities of elemental phosphorus ($P_4$) and after some initial processing by, for example, coagulation, neutralization and clarification, the resulting aqueous liquid may contain from about 10 ppm to about 3 ppm of elemental phosphorus.

Phosphorus has been found to be particularly toxic to aquatic life, especially fish. Thus from an environmental protection point of view, the discharge of phossy water to aquatic life bearing water bodies should be avoided. It has been reported, that autopsies on fish killed by elemental phosphorus poisoning discloses the nearly complete disintegration of blood cells by homolysis. Studies have shown that fish are extremely sensitive to elemental phosphorus.

It is therefore desirable to reduce the elemental phosphorus ($P_4$) content of the phossy water from, say about 10 ppm, to only a few parts per billion, e.g. less than 5 ppb.

Due to the colloidal nature of the suspension of the elemental phosphorus in the aqueous medium, it is extremely difficult to separate out the solid elemental phosphorus by physical methods, such as filtration and centrifuging. In addition, simple dilution of this waste effluent is ineffective since the elemental phosphorus tends to accumulate at the discharge point of the waste water rather than be dispersed.

The present invention makes it possible to decrease the elemental phosphorus content of an aqueous medium below a level of, for example, 5 ppb and hence allow the safe discharge of the treated aqueous medium to water bodies or to storage where water seepage may find its way into aquatic life bearing water bodies.

U.S. Pat. No. 3,971,707 to Deshpande attempts to solve the aforementioned problem by electrolysis. Needless to say, this process requires complicated and expensive equipment.

In the past, phossy water has been treated with calcium hydroxide, lime, etc. Such treatments, however, were generally performed at low pH and thus did not achieve the dramatic results achieved by this invention. See, for example, the following references:

*Phosphorus and Its Compounds*, Van Wazer, John R. (1961), Vol. II p. 1204–1205;

*Direct Determination of Elemental Phosphorus By Gas-Liquid Chromatography*, Ackerman et al. Proc. Chem. Inst. of Canada. Polln. Conf., Halifax, August 1969, pp. 140–147;

*Coexistence of a Fishery and a Major Industry In Plancentia Bay, Newfoundland*, Proc. Chem. Inst. Canada Polln. Conf., Halifax, August 1969, pp. 5–15;

*Waste Control In a Fragile Environment*, Environ. Science and Tech. V., 6, 980 (1972);

U.S. Pat. No. 3,971,707, Deshpande, Erco Industries Ltd., Issued July 27, 1976.

OBJECTS AND SUMMARY OF INVENTION

It is an object of this invention to provide a process for decreasing the elemental phosphorus level in phossy water to a level suitable for discharge to aquatic life bearing water bodies.

It is a further object of this invention to provide a process for decreasing the elemental phosphorus content of an aqueous medium containing about 10 ppm or less of elemental phosphorus.

It is a further object of this invention to provide a process for decreasing the elemental phosphorus levels in an aqueous medium with a process which is comparatively simple, inexpensive and practical.

In accordance with the present invention, a process is provided for decreasing elemental phosphorus levels in an aqueous medium containing elemental phosphorus. The process comprises adding to the aqueous medium an effective amount of caustic of the formula $M(OH)_n$ wherein M is selected from the group consisting of lithium, sodium, potassium, magnesium, calcium and barium; and n is a valence factor for M, being 1 where M is selected from lithium, sodium and potassium, and 2 where M is selected from magnesium, calcium and barium. The effective amount is an amount sufficient to increase the pH of the aqueous medium to at least about 11, to produce a basic aqueous medium.

A preferred caustic is calcium hydroxide, i.e. $Ca(OH)_2$.

Preferably the elemental phosphorus levels in the aqueous medium before treatment are 10 ppm or less, and most preferably 3 ppm or less.

The basic aqueous medium may be subsequently clarified and neutralized.

DETAILED DESCRIPTION OF THE INVENTION

Preferably the elemental phosphorus level in the aqueous medium should be about 10 ppm or less and most preferably 3 ppm or less. Above such levels the elemental phosphorus content of the aqueous medium is difficult to reduce to levels less than 5 ppb and other processes may be more economically utilized.

Generally, the aqueous medium containing elemental phosphorus is obtained from water used in the electric furnace process for manufacturing elemental phosphorus. This water is primarily used to condense the elemental phosphorus vapor and to cover it at all times due to the combustibility of elemental phosphorus when exposed to air. Prior to treatment by the process of this invention the water may be coagulated, neutralized and/or clarified to reduce it to an elemental phosphorus content of about 10 ppm or less.

The caustic, which is to be added to the aqueous medium, is of the formula $M(OH)_n$. The cation, M, is an alkali metal or alkaline earth metal. A preferred group consists of lithium, sodium, potassium, magnesium, calcium and barium, both individually and in various combinations, e.g. mixtures of calcium and magnesium. In the foregoing formula for the caustic, n is a conventional valence factor for the metal M, being 1 for those molecules wherein M is an alkali metal such as sodium, lithium, potassium and being 2 where M is an alkaline earth metal such as calcium, magnesium and barium. The alkaline earth metals are preferred, with calcium being highly preferred, i.e. calcium hydroxide.

The caustic may be added to the aqueous medium in forms well known in the art, e.g. slaked, concentrated solution, "milk or lime", etc.

The addition of the caustic to the aqueous medium may be accomplished by simply adding the caustic to the aqueous medium and agitating the aqueous medium.

An effective amount of the caustic should be added to the aqueous medium. This effective amount is an amount sufficient to increase the pH of the aqueous medium to at least about 11, to produce a basic aqueous medium. The pH of 11, as shown by the examples below, is critical. Such a pH ensures the rapid reduction of the elemental phosphorus level in the aqueous medium to suitable levels, e.g. less than 5 ppb.

The basic aqueous medium may then be clarified using any commercial high molecular weight anionic flocculants, e.g. SEPARAN AP-273 from Dow Chemical, a partially hydrolyzed polyacrylamide. Typically a flocculant is used at, for example, a 3 ppm level added, for example, as a 1% solution. The solids are removed by settling and the clarified aqueous medium may then subsequently be neutralized, with, for example, acidic water, etc. In order to avoid the cost of acid chemicals, where applicable, an acidic water stream from the process itself may be utilized to neutralize or assist in neutralizing the clarified aqueous medium, for example, in the electric furnace process for preparing elemental phosphorus, typically, water from the kiln scrubber used for scrubbing the hot gas eminating from the kiln containing acidic gases. This stream may be utilized to assist in neutralizing the clarified aqueous medium.

The following examples are illustrative of the process of this invention and are not to be regarded as limitative.

EXAMPLES

Clarified phossy water having a pH of about 3.3 and an elemental phosphorus content of 2.662 ppm (2,662 ppb) was contacted with various amounts of lime (calcium hydroxide) to various pH's for various reaction times in a closed glass bottle. The basic solution was then neutralized with HCl, dissolving the calcium salts contained therein. The following is a summary of the results:

TABLE 1

ADDING LIME (CALCIUM HYDROXIDE) TO AN AQUEOUS MEDIUM CONTAINING ELEMENTAL PHOSPHOROUS ($P_4$) AT 2,662 PPB 2.662 PPM) - ROOM TEMPERATURE

| pH | REACTION TIME | BASIC ACQUEOUS MEDIUM $P_4$ (ppb) | NEUTRALIZED (HCL) AQUEOUS MEDIUM $P_4$ (ppb) |
|---|---|---|---|
| 11.0 | 20 hr. | 2.6* | Not neutralized |
| 8.6 | 20 hr. | 804 | Not neutralized |
| 11.5 | 4 hr. | Not meas. | 0* |
| 11.0 | 4 hr. | Not meas. | 0* |
| 9.3 | 4 hr. | Not meas. | 569 |
| 8.2 | 4 hr. | Not meas. | 426 |
| 11.0 | 4 hr. | 5* | 0* |
| 11.0 | 2 hr. | 4* | 0* |
| 11.0 | 1 hr. | 4* | 0* |
| 11.0 | 5 min. | 5* | 0* |
| 10.2 | 5 min. | 710 | 347 |
| 9.0 | 5 min. | 1162 | 513 |

*At 5 ppb or less $P_4$ levels experimental errors make it difficult to determine exact levels of $P_4$, i.e. values are estimates, but are less than 5 ppb.

From the foregoing results, it may be seen that addition of lime to produce a pH of at least 11 in the aqueous medium is critical to the rapid reduction of the elemental phosphorus content of the aqueous medium to less than 5 ppb.

What is claimed is:

1. A process for decreasing elemental phosphorus levels in an aqueous medium containing elemental phosphorus comprising adding to the aqueous medium an effective amount of caustic of the formula $M(OH)_n$ wherein M is selected from the group consisting of lithium, sodium, potassium, magnesium, calcium and barium, and n is a valence factor for M, being 1 where M is selected from lithium, sodium and potassium and 2 where M is selected from magnesium, calcium and barium, the effective amount being an amount sufficient to increase the pH of the aqueous medium to at least about 11, to produce a basic aqueous medium.

2. The process of claim 1, wherein the caustic is Ca(OH)$_2$.

3. The process of claim 1, wherein the elemental phosphorus levels are about 10 ppm or less.

4. The process of claim 1, wherein the elemental phosphorus levels are about 3 ppm or less.

5. The process of claim 1, further comprising clarifying the basic aqueous medium to produce a clarified aqueous medium.

6. The process of claim 5, further comprising substantially neutralizing the clarified aqueous medium.

* * * * *